Patented Mar. 6, 1951

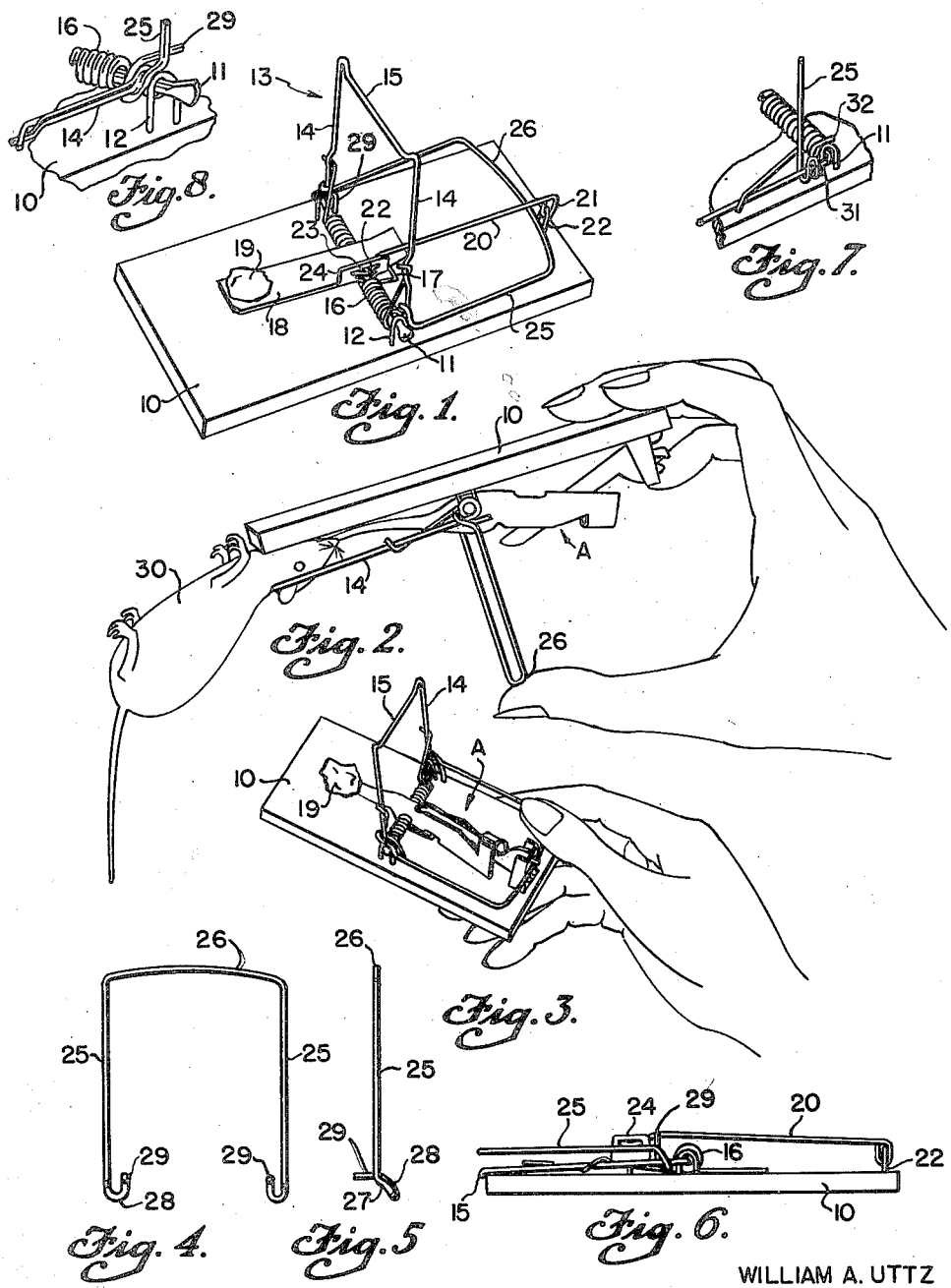

2,544,475

UNITED STATES PATENT OFFICE 2,544,475

MOUSETRAP ATTACHMENT

William A. Uttz, Fort Worth, Tex.

Application November 28, 1949, Serial No. 129,849

3 Claims. (Cl. 43—81)

This invention relates to improvements in mouse traps, and has for its object the provision of an attachment whereby a mouse may be removed from a trap without touching any part of the trap which is or has been in contact with a dead mouse.

Another object of the invention is to provide a relatively simple and inexpensive attachment for a mouse trap whereby the trap may be set without the danger of catching ones fingers.

A further object of the invention is to provide an attachment for mouse traps which, in addition to the foregoing, will not interfere with compactly stacking or boxing several such traps even though the attachments are connected thereto.

A further object of the invention is to provide an attachment of the described character which may be used for setting any conventional mouse trap having a rectangular base and a square or rectangular striker member made of wire.

These and other objects of the invention will become apparent from the following description of the accompanying drawing, wherein:

Figure 1 is a perspective view of a conventional mouse trap in its baited or set position and showing the location of the present attachment positioned thereon.

Figure 2 is a perspective view of a similar type of mouse trap and showing the position of the same when removing a dead mouse.

Figure 3 is a perspective view of a mouse trap and showing the means whereby the present attachment may be used for setting the trap.

Figure 4 is an elevation of the prefererd form of the invention.

Figure 5 is a side elevation of Figure 4.

Figure 6 is a side elevation of a trap, such as illustrated in Figure 1, and showing the present attachment in its folded position so as to conserve space when packing and shipping several such traps, and Figure 7 is a broken perspective view of a conventional mouse trap and showing a modified form of the invention attached thereto.

Figure 8 is an enlarged broken perspective view of a portion of Figure 1, and particularly showing the reverse bend construction for detachably securing the present invention to the sides of the trap's striker.

The mouse trap illustrated in Figure 1 is comprised of a rectangular base 10 having a transverse shaft 11 rotatably supported at its ends by means of staples or loose fitting bearings 12 secured in the upper surface of said base. A substantially square striker 13, having parallel side members 14 and a cross member 15 connecting the outer ends thereof is pivotally connected with the shaft 11. The coil spring 16 is wound around the shaft 11 and has a projection 17 forming a part thereof which contacts the surface of the base 10. The outer ends of the spring 16 extend away from the shaft 11 and are bent to engage the side members 14 of the striker 13.

There is a rectangular treadle 18 having one end pivotally engaged on the cross member 11, and the other or outer end is provided with suitable means, not shown, for supporting the bait 19. The end of the base 10, opposite the projecting end of the treadle 18, is provided with a latch 20 in the form of a wire having a loop 21 at its outer end for hingedly engaging a staple 22 in the end of the base 10. The loose end of the latch 20 is detachably engaged in the treadle 18 by any suitable means, such as by having the lateral bend 22 in the loose end of the latch 20 engage a slot 23 in an upturned flange 24 which is integral with the treadle. When setting the trap, the cross member 15 of the striker 13 is positioned beneath the latch 20 at its hinged end, and the loose end of the latch is detachably engaged with the treadle 18 after the latter has been provided with bait on its outer end. Thus, any pressure on the bait releases the latch 20 and the striker 15 or one of the side members 14 strike and engage the mouse and hold the same against the base 10.

Although the invention may be adapted to all mouse traps of the described class, it is to be understood that the present attachment is also adaptable to mouse traps having automatic latching mechanisms A, such as shown in Figures 2 and 3, wherein the striker 13 is ordinarily connected by hand with the latch without having to touch the latter.

The preferred form of the invention, illustrated in Figures 4 and 5, is of wire, and is in the form of a substantially square inverted U, and is comprised of parallel side members 25 and an integral connecting cross member 26 at the upper or outer end thereof. The inner ends of the side members 25 are bent to form obtuse angles with respect to the length thereof and with the plane defined by the side members 25, and which ends are reversely bent where they terminate in projections which are substantially perpendicular to the referred to plane and project in a direction generally opposite the direction of the referred to angle. The angles referred to are identified by the reference numerals 27, whereas the inwardly directed bends are identified by the reference numerals 28. The projecting ends are referred to by the numerals 29. The attachment is secured to the side members 14 of the striker 13 by securing the bends 28 therearound and with the projecting ends 29 positioned over the shaft 11. Thus, when the striker 13 is in its closed or "sprung" position, the attachment may be hingedly moved to a position above the base 10, as shown in Figure 6, for making a compact unit for packing. The attachment may be raised, and when it assumes a vertical position the bends 28 will contact the side members 14 of the striker 13. By further moving the attachment to a position where it is close to the surface of the base 10 at the latch supporting end of the latter, the striker 13 will be raised to a vertical position. While so positioned the latch 20 may be detachably engaged with the treadle 18 and over the cross member of the attachment. It will be noted that the user's fingers will be at the end of the base 10 opposite the end in which the mouse is to be caught, thus providing a means whereby there is very little danger of accidentally hurting fingers. As shown in Figure 2, the mouse 30 may be conveniently and sanitarily removed from the trap by inverting the latter and pressing the cross member 26 of the attachment toward the latch supporting end of the base 10. It will also be noted that the attachment may be initially and partially raised by pressing downwardly on one of the projecting ends 29. This arrangement provides for conveniently grasping the cross member 26, as required during the setting of the trap.

The modified form of the invention illustrated in Figure 7 contemplates an outwardly and upwardly directed double bend 31 in the form of a hook, and the projecting end 32 of which is directed over the shaft 11. In this form of the invention the attachment is always perpendicular to the plane of the striker 13 when attached to the side members 14 and must be removed therefrom in order to assume the closed or compact position illustrated in Figure 6.

The described forms of the invention may be made in many ways within the scope of the appended claims.

What is claimed is:

1. An attachment for a mouse trap having a spring actuated U-shaped striker forming a part thereof and having a shaft pivotally connected to the corresponding ends of the open end of said U-shaped striker, said attachment comprising a length of wire in the form of an inverted U, the end of said wire being formed with reverse bent portions adapted to engage the sides of the striker and having at least one free end portion extending at right angles to the plane of said U and adapted to be positioned across the shaft of the trap.

2. An attachment for a mouse trap having a spring actuated U-shaped striker and having a shaft pivotally connected to the corresponding ends of the open end of said U-shaped striker, said attachment comprising a length of wire in the form of an inverted U, the ends of said wire being formed with reverse bent portions adapted to engage the striker outwardly of the sides thereof, and at least one of said reverse bent portions having a free end extending substantially at a right angle with respect to the plane of said U and adapted to be positioned across the shaft of the trap.

3. An attachment for a mouse trap having a spring actuated U-shaped striker forming a part thereof and having a shaft pivotally connected to corresponding ends of the open end of said U-shaped striker, said attachment comprising a length of wire in the form of an inverted U, the ends of said wire being formed in the shape of reverse bent hooks adapted to engage the sides of the striker and having at least one free end portion extending substantially at a right angle to the plane of said U and adapted to be positioned across the shaft of the trap.

WILLIAM A. UTTZ.

REFERENCES CITED

The following references are of record in the file of this patent:

UNITED STATES PATENTS

| Number | Name | Date |
| --- | --- | --- |
| 1,995,344 | Gebhard | Mar. 26, 1935 |
| 2,059,119 | Korbisser | Oct. 27, 1936 |
| 2,525,533 | Dunkelberger | Oct. 10, 1950 |